Feb. 14, 1956 W. J. FOSTER 2,734,636
FILTER AND FLUID PRESSURE RELIEF VALVE THEREFOR
Filed Aug. 15, 1950 2 Sheets-Sheet 1
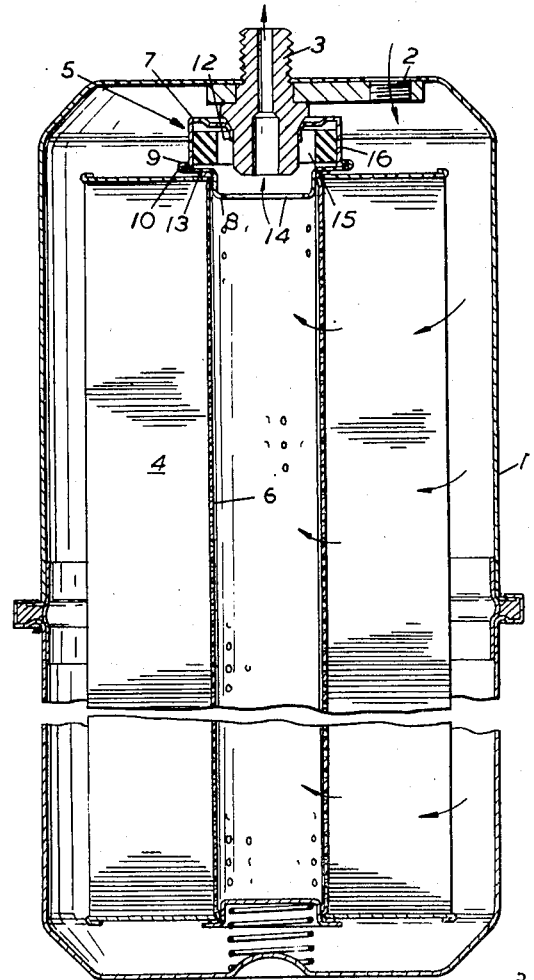
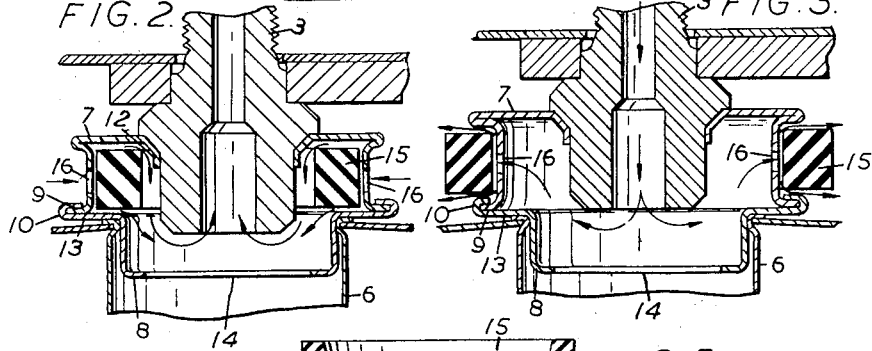
Inventor
William J. Foster
By
Willits Helwig & Baillio
Attorneys

United States Patent Office 2,734,636
Patented Feb. 14, 1956

2,734,636

FILTER AND FLUID PRESSURE RELIEF VALVE THEREFOR

William J. Foster, Flint, Mich., assignor to General Motors Corporation, Detroit, Mich., a corporation of Delaware Application August 15, 1950, Serial No. 179,610

Claims priority, application Great Britain July 21, 1950

4 Claims. (Cl. 210—164)

This invention relates to fluid pressure relief valves adapted for use with liquids and gases, for example, in engine lubrication systems, liquid fuel and gas supply systems, and hydraulic pressure systems generally.

It is of particular utility in liquid filters requiring a pressure relief valve by means of which liquid can pass from the inlet to the outlet should excessive pressures arise due to clogging of the filter element or to high viscosity of the liquid.

According to the present invention the relief valve consists of an annulus of flexible material mounted on a cylindrical support having radially directed apertures adjacent a cylindrical surface of the flexible annulus.

The relief flow can be either radially inward or radially outward.

The valve unit preferably comprises a pair of cup members fastened together by overlapped flanges, one of the cup members having a shoulder on which the flexible annulus can rest and the other having the radially directed apertures.

The scope of the invention is defined by the appended claims, and how it can be performed is hereinafter particularly described with reference to the accompanying drawings in which:

Figure 1 is a longitudinal section of a filter having a pressure relief valve according to the invention;

Figure 2 is an enlarged section of the valve shown in Figure 1 in a condition of by-passing fluid;

Figure 3 is a similar enlarged section of another form of valve, in the same condition;

Figure 5 is a similar section of part of a further modification.

In the various figures, the same reference numerals are applied to similar parts where feasible.

Figure 4:
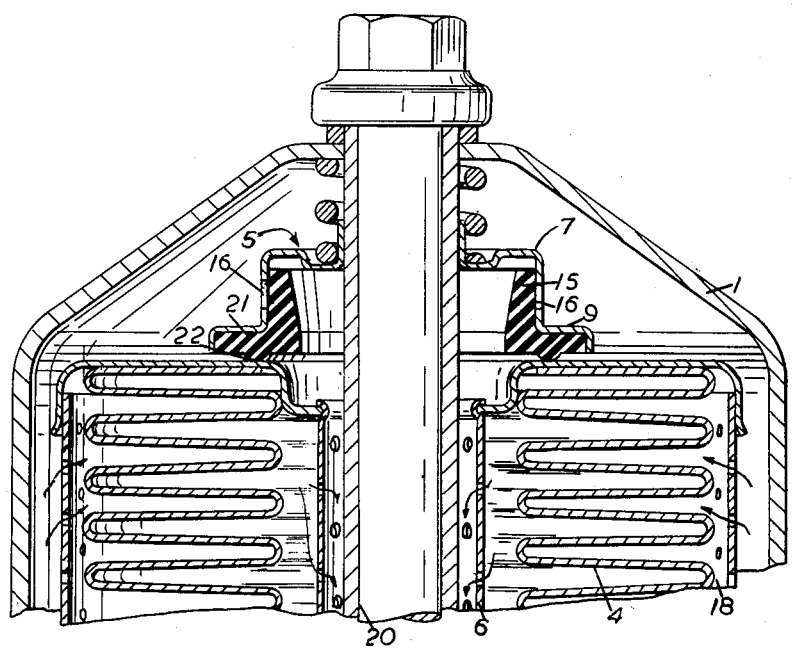
Figure 4 is a similar section of a third form of valve.

In applying the invention to an oil filter for an internal combustion engine, and comprising, as shown in Figure 1, a cylindrical casing 1 with inlet and outlet connections 2, 3 respectively with a cylindrical filter element 4 (which may be of any usual type such as impregnated paper, woven material, mineral wool and the like) the relief valve unit 5 is mounted coaxially on the inner end of the outlet nipple connection 2 and coaxial with the inner tube 6 of the filter element 4. As indicated above, the valve unit 5 consists of two cylindrical cup members 7 and 8 which are fastened together at their outer edges by overlapped flanges 9 and 10, the upper cup member 7 having an inturned cylindrical flange 12 to fit on the nipple 3, and the lower cup member having a shoulder 13 and an aperture 14 in its base through which filter oil can pass from the central tube 6 of the filter element 4 upwardly through the passage in the outlet nipple as shown by the arrows.

Within the cup members 7 and 8 and with slight clearance from the annular shoulder 13 is an annulus or ring 15 of flexible material such as synthetic rubber not likely to be deleteriously affected by oil.

The inner cylindrical surface of the ring 15 is spaced from the outer surface of the nipple 3, but its outer cylindrical surface fits against the inner cylindrical surface of the upper cup member 7 and in so doing closes the radially directed apertures 16 which are equidistantly spaced around the cylindrical surface of the upper cup member 7.

The flexibility and size of the annulus or ring 15 are such that when installed for example in a filter in the manner shown, and when a predetermined pressure rise between inlet and outlet pressures (that is pressures at the nipples 2, 3 respectively) is reached, the liquid will force itself inwardly through the holes 16 against the outer surface of the annular flexible member 15 and will then force that member away from the wall of the cup member 7 so that it can pass upwardly and downwardly and ultimately out through the central passage in the outlet nipple 3, as shown by the arrows in Figure 2.

The flexible ring 15 may have a certain free axial movement within the cup member 7, 8 but it should be of such dimension as to close off the apertures 16, under normal conditions, and should be of such flexibility as to operate as indicated above when predetermined pressure differences are experienced.

In the modification shown in Figure 3, the ring 15 is mounted on the outside of the cup member 7, so that the fluid flow through apertures 16 is outwardly against the inner cylindrical surface of the ring, as shown by the arrows.

In the third construction shown in Figure 4 the inlet and outlet connections are not shown since they are located at the bottom of the casing 1. The filter element 4 is of the concertina type and is supported in its own perforated casing 18 of which the central tube 6 forms a part.

The relief valve 5, in this construction performs not only its normal pressure-relief or bypass function but also acts as an end seal for the filter unit 4, 6 and 18 when it is positioned, as shown, coaxially with the central stem 20 of the whole assembly. This is effected by forming the ring member 15 with an annular flange 21 which is clamped within the flange 9 of the cup member 7 and whose under surface has a circular rib 22. This rib contacts directly with the upper annular surface of the casing containing the filter unit 4. Thus liquid under pressure normally passes from outside the casing 18, through the apertures therein, through the filter element 4 and then through the apertures in tube 6. The seal ring 22 prevents any by-pass flow from outside casing 18 to the inside of tube 6.

Should an excess pressure differential occur, the liquid presses against the cylindrical portion of flexible ring 15 and forces it inwardly so that the liquid can flow through apertures 16 and thence over the top of the ring and then downwardly between tube 6 and stem 20. In this modification the cylindrical portion of the ring 15 is tapered. This is one way by which the flexibility thereof can be predetermined.

As an alternative, or as an addition to, the tapering of the cylindrical part of the ring to obtain the required flexibility, the ring can be formed with an annular recess 23 (Figure 5) around the inner circular edge of the flange portion. Other shapes can be adopted for the same purpose.

Constructions according to this invention produce a constant predetermined pressure difference across the filter element irrespective of the inlet pressure so that if the filter element is blocked or if the viscosity of the liquid is high, there is no danger of damage to the element, nor is there any danger of the supply of liquid being cut off.

It will be clear that the relief valve can be applied to various forms of filter, the shape and substance of the filter element being immaterial (it can be circular, square, hexagonal or of any other polygonal shape in cross section); and that it can be applied to various other liquid and gaseous pressure installations.

What is claimed is as follows:

1. A pressure relief valve for fluids comprising a cup member having a base portion and a side wall portion, said side wall portion having one edge attached to said base and having a free edge at the opposite side, an opening in said base providing a fluid passage, apertures in said side wall portion of the cup for the passage of fluid, an annulus of flexible material engaging said side wall portion around said apertures and normally sealing said apertures and under excessive pressure moving to permit fluid to flow through said apertures, said annulus being restrained against lateral movement on said one side by a portion of the base of said cup and means secured to said free edge of said side wall portion to restrain said annulus against lateral movement.

2. A pressure relief valve for fluids comprising a fluid conduit, a cup member having a base portion and a side wall portion, said side wall portion having one edge attached to said base and having a free edge at the opposite side, an opening located in the central portion of said base providing a fluid passage, sealing means surrounding said opening to seal said base portion to said fluid passage, apertures in said side wall portion of said cup for the passage of fluid, an annulus of flexible material engaging said side wall portion around said apertures and normally sealing said apertures and under excessive pressure moving to permit fluid to flow through said apertures, said annulus being restrained against lateral movement on one side by a portion of the base of said cup, means secured to said free edge of the side wall portion to restrain said annulus against lateral movement, and sealing means between said free edge of the side wall portion and a fluid conduit to provide a seal.

3. A pressure relief valve for fluids comprising a first cup member having a base portion and a side wall portion, said side wall portion having one edge attached to said base and having a free edge at the opposite side, an opening located centrally in said base providing a connection with a fluid passage, apertures in said side wall portion of the cup for the passage of fluid, an annulus of flexible material engaging said side wall portion around said apertures and normally sealing said apertures and under excessive pressure moving to permit fluid to flow through said apertures, said annulus being restrained against lateral movement on said one side by a portion of the base of said first cup, a second cup having a flange extending from said free edge of said second cup and secured to said side wall portion adjacent said free edge, a shoulder on said second cup on the opposite side of said apertures from said base to restrain said annulus against lateral movement, said second cup extending in a direction opposite to said first cup and having a cylindrical side wall portion to provide a seal, and said second cup having an aperture in the base to provide a connection with a passage.

4. In combination with a filter for liquids, said filter comprising a filter element in a casing, a pressure relief valve in said casing including a conduit extending through the wall of said casing, a cup member coaxial with said conduit and having a base portion and a side wall portion, said side wall portion defining one edge of a shoulder on said base portion, an opening leading through the base portion by means of which said conduit communicates with the interior of said filter element, said side wall portion having an aperture, an annulus of flexible and resilient material engaging said side wall portion and normally sealing the said aperture, said shoulder being arranged to limit axial movement of said annulus, said annulus and cup member defining a passage between them, and the arrangement of the parts being such that above normal fluid pressure exerted through said aperture will distort said annulus from its normal relationship with said aperture thereby providing a fluid bypass of said filter element by way of said passage and aperture.

References Cited in the file of this patent

UNITED STATES PATENTS

| | | |
|---|---|---|
| 1,326,445 | Fewlass | Dec. 30, 1919 |
| 1,366,151 | Astrom | Jan. 18, 1921 |
| 1,473,562 | Jonsson | Nov. 6, 1923 |
| 1,938,218 | Dempsey | Dec. 5, 1933 |
| 2,191,611 | Eshbaugh et al. | Feb. 27, 1940 |
| 2,250,299 | Downing | July 22, 1941 |
| 2,287,344 | Easton et al. | June 23, 1942 |
| 2,294,330 | Clark | Aug. 25, 1942 |
| 2,313,284 | Valentine | Mar. 9, 1943 |
| 2,321,236 | Parkin | June 8, 1943 |
| 2,412,232 | Sutton | Dec. 10, 1946 |
| 2,512,694 | Stout et al. | June 27, 1950 |
| 2,533,266 | Kovacs et al. | Dec. 12, 1950 |
| 2,557,557 | Newcum | June 19, 1951 |